(12) United States Patent
Reiker

(10) Patent No.: US 6,281,439 B1
(45) Date of Patent: Aug. 28, 2001

(54) ELECTRICAL BOX WITH ENHANCED SUPPORT FOR CARRYING FIXTURES

(75) Inventor: Kenneth H. Reiker, Shalimar, FL (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

(21) Appl. No.: 09/307,715

(22) Filed: May 10, 1999

Related U.S. Application Data

(63) Continuation-in-part of application No. 08/905,141, filed on Aug. 1, 1997, which is a continuation-in-part of application No. 08/862,379, filed on May 23, 1997, now Pat. No. 5,965,845, which is a continuation-in-part of application No. 08/490,757, filed on Jun. 15, 1995, now Pat. No. 5,677,512, which is a continuation-in-part of application No. 08/371,695, filed on Jan. 12, 1995, now Pat. No. 5,854,443, application No. 09/307,715, which is a continuation-in-part of application No. 08/862,379, application No. 09/307,715, which is a continuation-in-part of application No. 08/905,142, filed on Aug. 1, 1997, which is a continuation-in-part of application No. 08/862,378, filed on May 23, 1997, application No. 09/307,715, which is a continuation-in-part of application No. 08/905,077, filed on Aug. 1, 1997, which is a continuation-in-part of application No. 08/862,378, and a continuation-in-part of application No. 08/904,691, filed on Aug. 1, 1997, which is a continuation-in-part of application No. 08/862,379, application No. 09/307,715, which is a continuation-in-part of application No. 08/862,380, filed on May 23, 1997.

(60) Provisional application No. 60/023,060, filed on Aug. 2, 1996, and provisional application No. 60/018,227, filed on May 24, 1996.

(51) Int. Cl.[7] .................................................. H02B 1/30
(52) U.S. Cl. ................................. 174/62; 174/51; 220/3.2
(58) Field of Search ................................. 174/51, 58, 61, 174/62, 48, 53, 57; 220/3.2, 3.8, 3.3, 3.9; 248/906, 205.3

(56) References Cited

U.S. PATENT DOCUMENTS

| Re. 33,147 | 1/1990 | Reiker . |
|---|---|---|
| Re. 34,603 | 5/1994 | Caison et al. . |
| 950,176 | 2/1910 | Hublinger . |
| 1,066,706 | 7/1913 | Caine . |
| 1,824,708 | 9/1931 | Davis et al. . |
| 2,959,633 | 11/1960 | Palmer et al. . |
| 3,168,613 | 2/1965 | Palmer . |
| 3,340,349 | 9/1967 | Zerwes . |
| 3,616,096 | 10/1971 | Roeder . |

(List continued on next page.)

FOREIGN PATENT DOCUMENTS

| 2436518 | 5/1980 | (FR) . |
|---|---|---|
| 1309950 | 3/1973 | (GB) . |

Primary Examiner—Dean A. Reichard
Assistant Examiner—Angel R. Estrada
(74) Attorney, Agent, or Firm—Shlesinger, Arkwright & Garvey LLP

(57) ABSTRACT

An electrical junction box or a mounting assembly includes a box having a top wall and a side wall. The side wall extends downwardly away from the top wall and defines a cavity therein. A fixture support extends into the cavity and supports an electrical fixture. A threaded hole may be provided on the fixture support. Preferably, the fixture support has exposed portions which are sufficiently smooth for preventing wear to plastic-coated electrical wires which engage such exposed surfaces of the fixture support. Two or more fixture supports may be provided. The fixture support may enhance the use of conventional inwardly extending ears. An adhesive element, such as double-sided tape, may be provided on the box for rapid attachment thereof to a support surface.

47 Claims, 10 Drawing Sheets

U.S. PATENT DOCUMENTS

| | | |
|---|---|---|
| 3,770,872 | 11/1973 | Brown . |
| 4,019,647 | 4/1977 | Arnold . |
| 4,050,603 | 9/1977 | Harris et al. . |
| 4,062,512 | 12/1977 | Arnold . |
| 4,180,226 | 12/1979 | Matte . |
| 4,233,697 | 11/1980 | Cornwall . |
| 4,275,862 | 6/1981 | Takagi et al. . |
| 4,281,773 | 8/1981 | Mengeu . |
| 4,306,109 | 12/1981 | Nattel . |
| 4,315,100 | 2/1982 | Haslbeck et al. . |
| 4,408,696 | 10/1983 | Crosson . |
| 4,684,092 | 8/1987 | Reiker . |
| 4,770,311 | 9/1988 | Wang . |
| 4,788,383 | 11/1988 | Caison . |
| 4,873,600 * | 10/1989 | Vogele ............................ 174/50 X |
| 4,909,405 | 3/1990 | Kerr, Jr. . |
| 4,919,292 | 4/1990 | Hsu . |
| 4,960,964 | 10/1990 | Schnell et al. . |
| 4,967,990 | 11/1990 | Rinderer . |
| 4,988,067 | 1/1991 | Propp et al. . |
| 5,044,582 | 9/1991 | Walters . |
| 5,183,223 | 2/1993 | LaPalomento . |
| 5,239,132 | 8/1993 | Bartow . |
| 5,303,894 | 4/1994 | Deschamps et al. . |
| 5,359,152 | 10/1994 | Hone-Lin . |
| 5,407,088 | 4/1995 | Jorgensen et al. . |
| 5,435,514 | 7/1995 | Kerr, Jr. . |
| 5,661,264 | 8/1997 | Reiker . |
| 5,677,512 | 10/1997 | Reiker . |
| 5,762,223 | 6/1998 | Kerr, Jr. . |
| 5,854,443 | 12/1998 | Reiker . |
| 5,860,548 | 1/1999 | Kerr, Jr. . |
| 5,954,304 | 9/1999 | Jorgensen . |
| 5,965,845 | 10/1999 | Reiker . |
| 5,981,874 | 11/1999 | Reiker . |
| 6,004,642 | 12/1999 | Langford . |

\* cited by examiner

ELECTRICAL BOX WITH ENHANCED SUPPORT FOR CARRYING FIXTURES

CROSS-REFERENCE TO RELATED APPLICATIONS

This application is a continuation-in-part of application Ser. No. 08/862,379, filed May 23, 1997, now U.S. Pat. No. 5,965,845, and this application is a continuation-in-part of application Ser. No. 08/905,141, filed Aug. 1, 1997, which claims the priority of application Ser. No. 60/023,060, filed Aug. 2, 1996, and which application Ser. No. 08/905,141 is a continuation-in-part of application Ser. No. 08/862,379, filed May 23, 1997, and which is a continuation-in-part of application Ser. No. 08/490,757, filed Jun. 15, 1995, now U.S. Pat. No. 5,677,512, which is a continuation-in-part of application Ser. No. 08/371,695, filed Jan. 12, 1995 now U.S. Pat. No. 5,854,443; and this application is a continuation-in-part of application Ser. No. 08/905,142, filed Aug. 1, 1997, which is a continuation-in-part of application Ser. No. 08/862,378, filed May 23, 1997, which claims priority of application Ser. No. 60/018,227, filed May 24, 1996; and this application is a continuation-in-part of application Ser. No. 08/905,077, filed Aug. 1, 1997, which is a continuation-in-part of application Ser. No. 08/862,378, filed May 23, 1997; and this application is a continuation-in-part of application Ser. No. 08/904,691, filed Aug. 1, 1997, which is a continuation-in-part of application Ser. No. 08/862,379, filed May 23, 1997; and this application is a continuation-in-part of application Ser. No. 08/862,380, filed May 23, 1997, which claims the priority of application Ser. No. 60/023,060, filed Aug. 2, 1996, and which application 08/862,380 claims the priority of application Ser. No. 60/018,227, filed May 24, 1996.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than n the prior art.

OBJECTS AND SUMMARY OF THE INVENTION

An object of the invention is to overcome the drawbacks of known electrical boxes.

Another object of the invention is to provide two (2) electrical boxes in one; e.g., an installer can use the inventive electrical box to install a first type of fixture requiring a first type of fastener, and the installer can use the box to install a second type of fixture requiring a second type of fastener, so that the installer always has the proper fastener. This object also fulfills the object of reducing the amount of inventory a retailer must carry.

A further object of the invention includes making electrical boxes which use the standard punched-out, stamped electrical boxes in a more intelligent fashion.

Yet another object of the invention is to provide a standard industry size electrical box with a fixture support for supporting a fixture, and that is located the proper distance from a second fixture support, and meets National Electrical Code (NEC) standards.

Another object of the invention is to fully exploit the strength of fixture support studs, the top wall, and the side walls of electrical boxes.

A further object of the invention is to provide a square junction box having fixture supports at four corners thereof.

A further object of the invention is to provide a junction box having four fixture supports, two fixture supports being a first type, and two fixture supports being of a second type.

A still further object of the invention is to provide a junction box suited for direct attachment to a mounting location, such as a ceiling joist, and for carrying the static and dynamic loading of a ceiling fan by itself.

Another object of the invention is to provide a junction box having a fixture support which is a rivet and/or a modified pull rivet.

Another object of the invention is to provide a junction box having a fixture support with strengthening members disposed thereon for securing the attachment of the fixture support to the junction box, as well as for enhancing the load-carrying capability of the box, such as for carrying electrical fixtures.

Another object of the invention is to achieve a strengthened electrical box with a fixture support that is contained within a standard so-called "4×4" box, while maintaining the near universal 3.5 inch (8.9 cm) spacing between the fixture supports so that the box is usable with standard light fixtures, ceiling fans, and the like, and so that the box can be located in a standard 4"×4" hole in a gypsum board wall, for example.

It is likewise an object of the invention to provide metal inserts in and/or on the electrical boxes to enhance the carrying strength of the electrical boxes.

A further object of the invention is to provide studs in the electrical boxes that strengthen the electrical boxes.

Yet another object of the invention is to provide studs in the electrical boxes which cover the threads of standard screws so that no screw threads are present in the interior of such electrical boxes.

A still further object of the invention is to provide an electrical box having a fixture support with a sufficiently smooth exterior for preventing wear to the plastic coating of plastic-coated electrical wire.

It is yet another object of the invention to provide electrical boxes in which supports, such as studs, are added during the manufacturing process to eliminate problems in prior art electrical boxes, as well as to strengthen the inventive electrical boxes.

Another object of the invention is to provide a junction box having a fixture support, yet which requires no screwing of fasteners nor welding during assembly thereof.

Yet another object of the invention is to provide an electrical box having components which are easily fabricated, added to the electrical box, and assembled in the final form by the operation of pressing or riveting, yet which do not loosen when subjected to static and/or dynamic loading.

A still further object of the invention is to provide a junction box in which the fixture support for carrying static and dynamic loads automatically extends in the desired direction along the side walls of the junction box during assembly and/or in use thanks to the fixture support being configured for engaging the side wall and/or fixture support when the support is attached and located in its attached, final form ready for use.

A still further object of the invention is to provide a junction box capable of carrying static and/or dynamic loads that has an support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly which includes an electrical junction box or mounting assembly including a box having a top wall and a side wall. The side wall extends downwardly away from the top wall and defines a cavity therein. A fixture support extends into the cavity and support an electrical fixture. A threaded hole may be provided on the fixture support. Preferably, the fixture support has exposed portions which are sufficiently smooth for preventing wear to plastic-coated electrical wire which engages such exposed surfaces of the fixture support. Two or more fixture supports may be provided. The fixture support may enhance the use of conventional inwardly extending ears. An adhesive element, such as double-sided tape, may be provided on the box for rapid attachment thereof to a support surface.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

DESCRIPTION OF THE PRIOR ART

Figure 1:
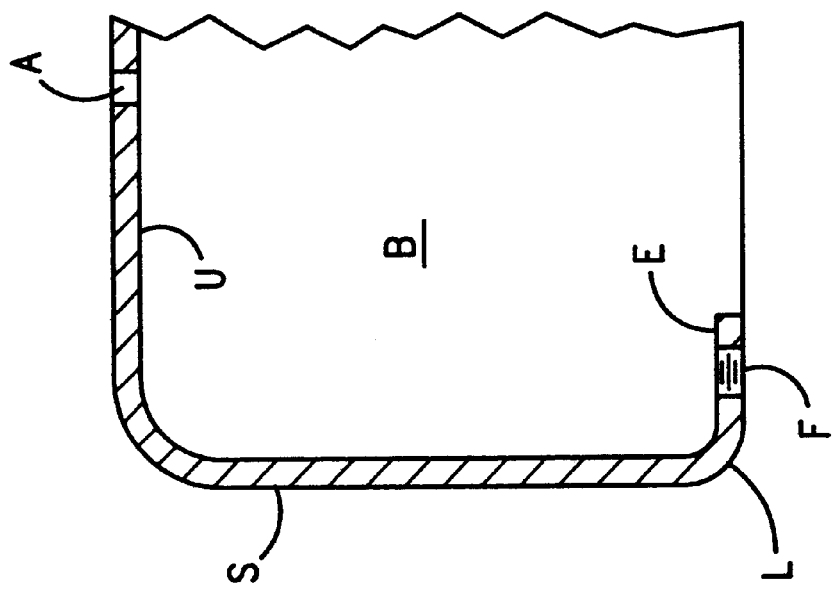
FIG. 1 is a cross sectional view of a PRIOR ART electrical junction box having an inwardly extending ear E with a fixture attachment hole F provided therein, and the hole F is typically provided with support threads the supporting length of which are limited to the thickness of the metal ear E.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, fixture or faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes B is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 cm$^2$). In addition, the carrying strength of the typically threaded hole F is limited by the thickness of the metal from which ear E is made. Consequently, ear E may only carry relatively small vertical loads, when installed against the ceiling, as described above.

As a result, local codes frequently allow such PRIOR ART boxes B to be used only for supporting the weight of a faceplate, or of a relatively light static or dynamic load, such as a light fixture or fan weighing 35 lbs. or less.

Such electrical boxes B are unsuited for supporting large static loads, as well as for supporting large dynamic loads, such as ceiling fans which may weigh sixty (60 lbs.)/twenty-seven kilograms or more (27 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Figure 2:
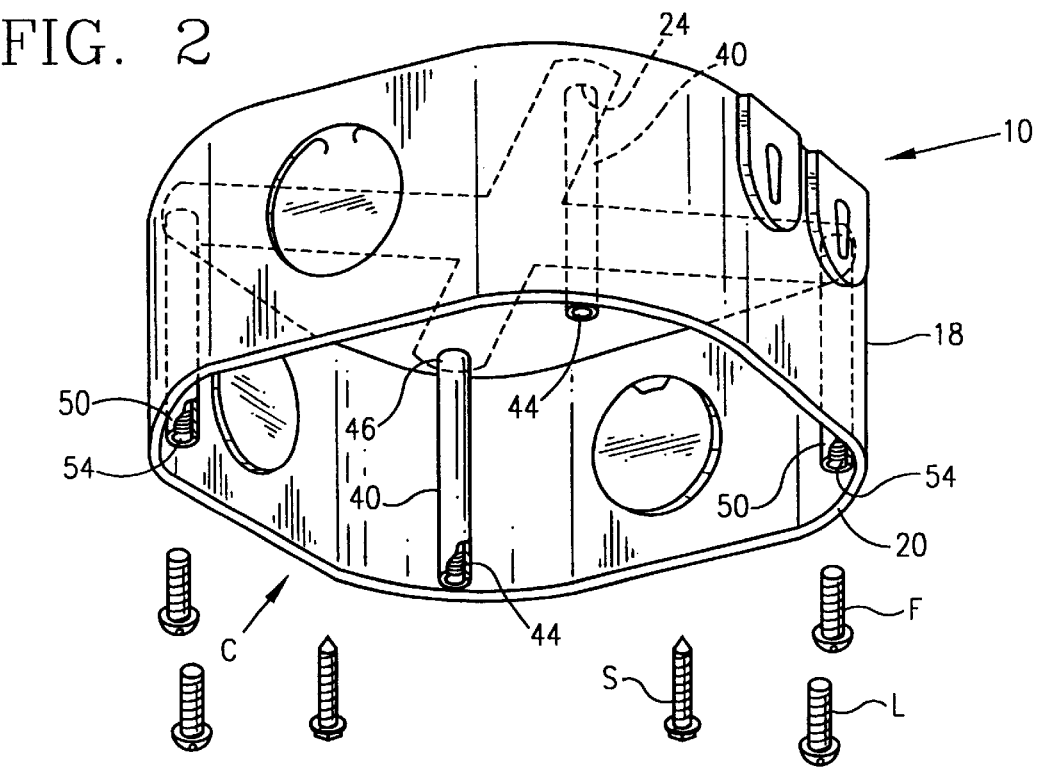
FIG. 2 is a perspective view of a preferred embodiment of an electrical junction box according to the invention having four supports.
Figure 3:
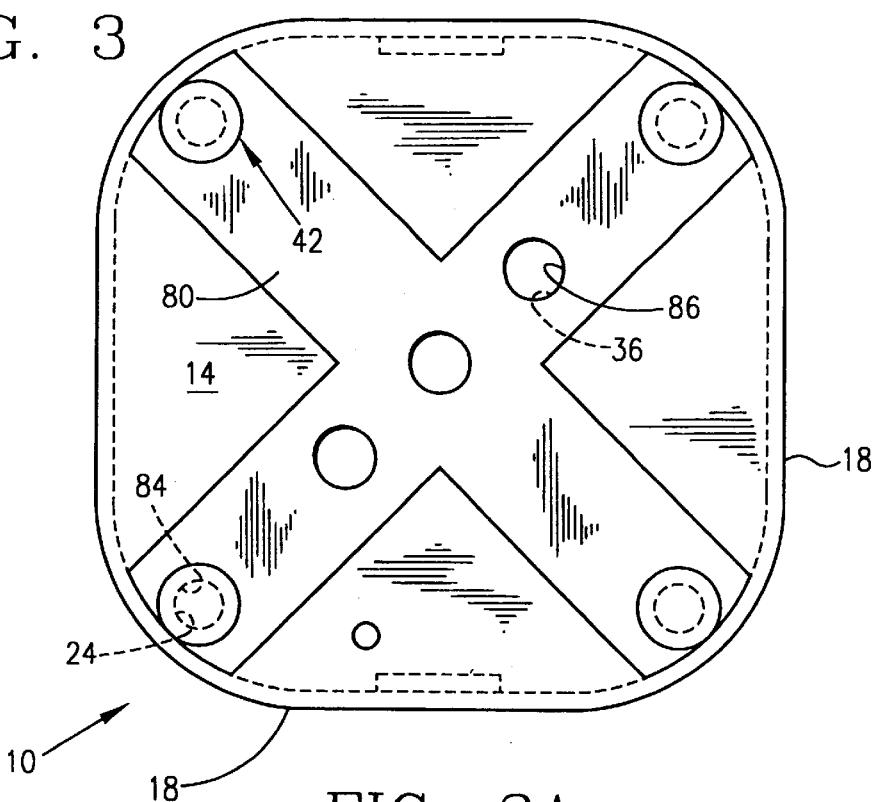
FIG. 3 is a top plan view of FIG. 2.

FIGS. 2 and 3

Turning to FIGS. 2 and 3, a first preferred embodiment of an electrical box and/or junction box 10 according to the invention will now be described in detail.

Junction box 10 includes a top wall 14, and a side wall 18 extending downwardly therefrom and defining a cavity C therein. Side wall 18 includes a lower free edge 20.

Preferably, one or more punchouts 24 are provided on top wall 14, for example.

Additional holes or punchouts 36 for receiving portions of an electrical fixture, for example, and/or for receiving fasteners which secure junction box 10 to a ceiling or joist, for example, may likewise be provided.

A fastener 42, such as a screw, bolt, or a rivetable head directly connected to support 40 may be provided. Such rivet-like fasteners 42 may be constructed so that, on installation, an upper region 46 of fastener 42 compresses sufficiently for "locking" fastener 42 to box 10 thanks to top wall 14 of box 10 being held between compressed upper region 46 and fastener head 48. The need for such compression and the extent thereof will be determined by the materials involved, and whether an additional strengthening element is used, for example.

FIG. 2 illustrates a support 40 which may be provided for increasing the holding strength of junction box 10.

Support 40 may be made with a height substantially equal to the distance between lower free edge 20 and the inner face of top wall 14 (i.e., the face facing cavity C).

Depending on the fixture to be installed, support 40 will be disposed completely within cavity C or will extend out past lower free edge 20. This is true for all the preferred embodiments of the invention.

Preferably, a second pair of spaced apart further fixture supports 50 will be provided.

Further fixture supports 50 may be provided spaced apart from the paired fixture supports 40; or, fixture supports 50 and 40 may be disposed substantially adjacent each other. For many applications of box 10, an important consideration is maintaining a standard offset between the center lines of threaded holes 54,54 and between threaded holes 44,44 so that box 10 may be used for supporting lights and ceiling fans having such standard spacing. Standard spacing nowadays when box 10 is in use is set at 3.5 inches center-to-center.

Good results have been achieved when threaded hole 54 of fixture support 50 has a thread size which differs from the thread size of threaded hole 44 of support 40. For example, threaded hole 54 may be a 10–32 inch female thread for mating with a 10–32 male thread on fastener F, and threaded hole 44 may be provided with a 8–32 inch female thread for mating with counterpart male 8/32 inch may threads on fastener L. In that manner, the pair of fixture support 50 would be used when the installer is mounting a ceiling fan with fasteners F, and the paired fixture supports 50 could be used when the installer is mounting a light fixture by using fastener L. In that manner, the object of providing two boxes in one so that the installer always has the correct electrical box on hand is achieved.

Junction box 10 may have metal walls and a cross-shaped or plus sign ("+") strengthening element 80, which likewise may be made of metal. It is contemplated that top wall 14 and side wall 18 may be made of plastic, and strengthening element 80 be made of metal or plastic, or vice versa.

Strengthening element 80 may be provided with holes 84 aligned with holes 24 so that supports 40 and 50 pass therethrough; likewise, strengthening element 80 may be provided with holes 86 aligned with holes 36 in top wall 14 so that a box fastener S may extend therethrough for securing box 10 to a support, such as a wall stud or the lower face of a ceiling joist. Strengthening element 80 may be a "+" sign shaped plate, for example.

Alternatively threads 44 may be 8–32 threads which are standard for receiving light fixture fasteners, and threads 54 may be 10–32 threads which are standard for receiving the mating 10–32 male threads of ceiling fan fasteners.

Accordingly, alternately, in use, the user would attach a ceiling fan to the paired supports 50 by use of a ceiling fan fastener F. In a like manner, the user would attach a light fixture to paired supports 40 by use of a pair of light fixture fasteners L.

It is contemplated that each of the fixture fasteners 40 and 50 have the same thread size or different thread sizes, depending on the expected use.

When two fixture supports 40 are attached to the left and right ones of holes 24, placement of support 40 substantially adjacent side wall 18 yields the added benefit of achieving a standard center-to-center spacing between respective threads 54 of each of the two supported supports 40, even when using "standard" box forming equipment for making a standard box size, as discussed in greater detail below. Such also has the benefit of allowing use of standard equipment for forming holes in a sheetrock ceiling for receiving box 10, while maintaining the standard 3.5 inch fixture fastener offset.

It will be appreciated that there are advantages in restricting the tendency of support 40 to move within a vertical plane. Such restriction helps maintain the integrity of the initial connection between support 40 and junction box 10; e.g., the connection between both top wall 14 and support 40, and between side wall 18 and support 40.

Still further, restricting such tendency of support 40 to move/rotate within a vertical plane helps to ensure that support 40 (and threads 52) extend substantially parallel to side wall 18 of junction box 10 before and during use, for example. Needless to say, all those aspects of fine-tuning of the connection between support 40 and the remainder of junction box 10 are geared for achieving predictability of where the lower portion of threads 54 support 40 is.

Head 42 of support 40, for example, likewise assists in locating support 40 relative to box 10 and in restricting movement relative thereto. Head 42 may be provided with a diameter of 0.375 inches (9.525 mm) when a body 46 has a diameter of 0.25 inches (6.35 mm).

Needless to say, the disclosed connections and configurations act to restrict all movements between supports 40 and/or 50 and the remainder of box 10. The above discussion regarding restriction of movement within a "vertical" plane is merely an example.

By restricting movement of supports 40 and/or 50, there is achieved the desired predictability of where the lower portion of female thread 44, 54 is located so that the desired spacing between a left hand one of support 40 and a right hand one of support 40 is achieved. Typically, the spacing between the commonly provided two (2) female threads 44 and 54 (i.e., left and right ones) attached to and extending from left and right ones of supports 40 and 50, respectively, as shown in broken-away portion of FIG. 2 will be achieved. Known light fixtures, for example, are provided with respective left and right male fasteners, three and one half (3½) inches on center, which will be mated with such left and right female threads 44 and 54, during final use of the illustrated junction boxes.

All the advantages described regarding the stabilizing of and the location of threads 44 and 54 and, hence, support 40 and 50, relative to the remainder of junction box 10 hold true for all the other preferred embodiments of the invention.

FIG. 3A

Figure 3A:
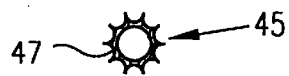
FIG. 3A is a cross-sectional view of optional fluting.

When increased resistance to inadvertent turning of support 40 about the longitudinal axis of fastener 42 is desired, support 40 may be provided with an outer surface or face 45 with or without fluting 47 configured for engaging with a portion of hole 24 for restricting rotation of support 40. As shown in FIG. 3A, configured face 44 may be made as a rough or knurled surface, with fluting 47 thereon. Such may be made as disclosed in Applicant's co-pending application Ser. No. 08/862,379, filed May 23, 1997, which is incorporated herein by reference, as well as in Applicant's copending application Ser. No. 08/905,142, filed Aug. 1, 1997, which is incorporated herein by reference.

The non-configured exterior face of support 40 may be made as a rounded surface 46, as shown. Good results have been achieved with individual flutes of fluting 47 being sufficiently long to extend outwardly of a rounded/relatively smooth surface of hole 24.

In one embodiment, fifteen (15) to twenty (20) flutes were used on support or stud 40 having a nominal diameter of 0.25 inches (6.35 mm). There may be as few as one (1) to fourteen (14) flutes on fluting 47, for example, depending on the flute length and the intended use of the standard 4" box.

When using fixture supports, such as support 40 having fluting 47, there is no need to compress support 40 along its longitudinal axis relative to head 42 and in the region of head 42, as is done with conventional rivets having no fluting 47. Rather, the inventive box may be assembled by inserting support 40 through hole 24. When the flutes of fluting 47 engage the inner wall defining hole 24, sufficient force will be applied on support 40 so that the outwardly extending fluting 47 engages with/cuts into the material of top wall 14 of box 10, for example. In the case where strengthening element 80 is used, holes 84 of strengthening element 80 may be sized so that fluting 47 engages with the side walls of holes 84, or not, depending on the intended use.

Good results have been achieved when a threaded hole 54 is provided extending at least partially through support 40. Preferably, threaded hole 54 has threads selected to mate with those of fasteners of electrical fixtures such as lights and ceiling fans. Typically, threads 54 are provided at least a lower portion of support 40.

Support 40 may be attached to box 14 by use of a powered tool driving (e.g., pressing or riveting) support 40 into hole 24, such as described in relation to FIGS. 2 and 3 of Applicant's co-pending application Ser. No. 08/905,142 filed Aug. 1, 1997, which is incorporated herein by reference.

The threads of threaded hole 54 may extend substantially the entire length through support 40, so that fasteners of various lengths for attaching a light fixture or ceiling fan, for example, may be attached to support 40 and, hence, to electrical box 10, from below during use.

It is likewise contemplated that threads 54 will only be provided at the top portion of support 40, at the bottom portion of support 40, or at both top and bottom portions with an unthreaded region in between.

Figure 4:
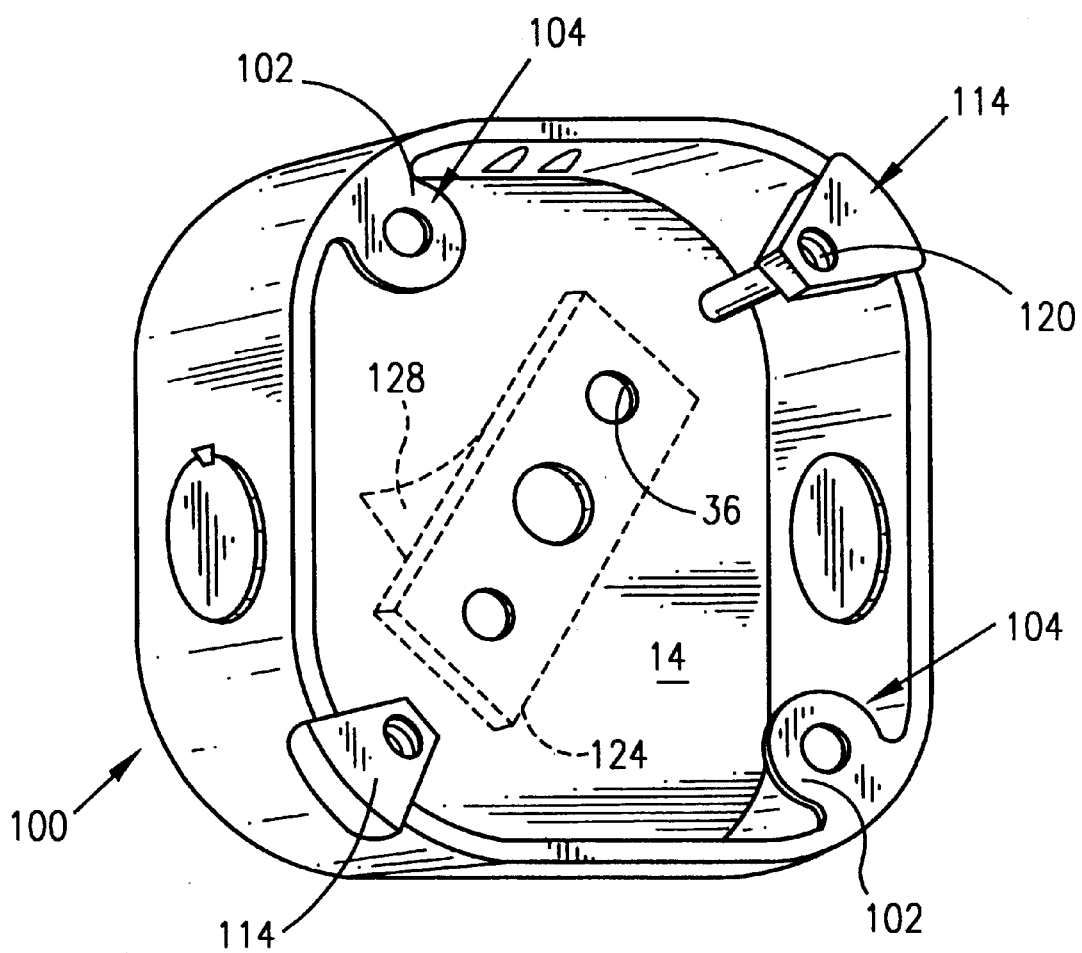
FIG. 4 is a perspective view of a still further preferred embodiment of a junction box according to the invention that has four (4) fixture supports.
Figure 5:
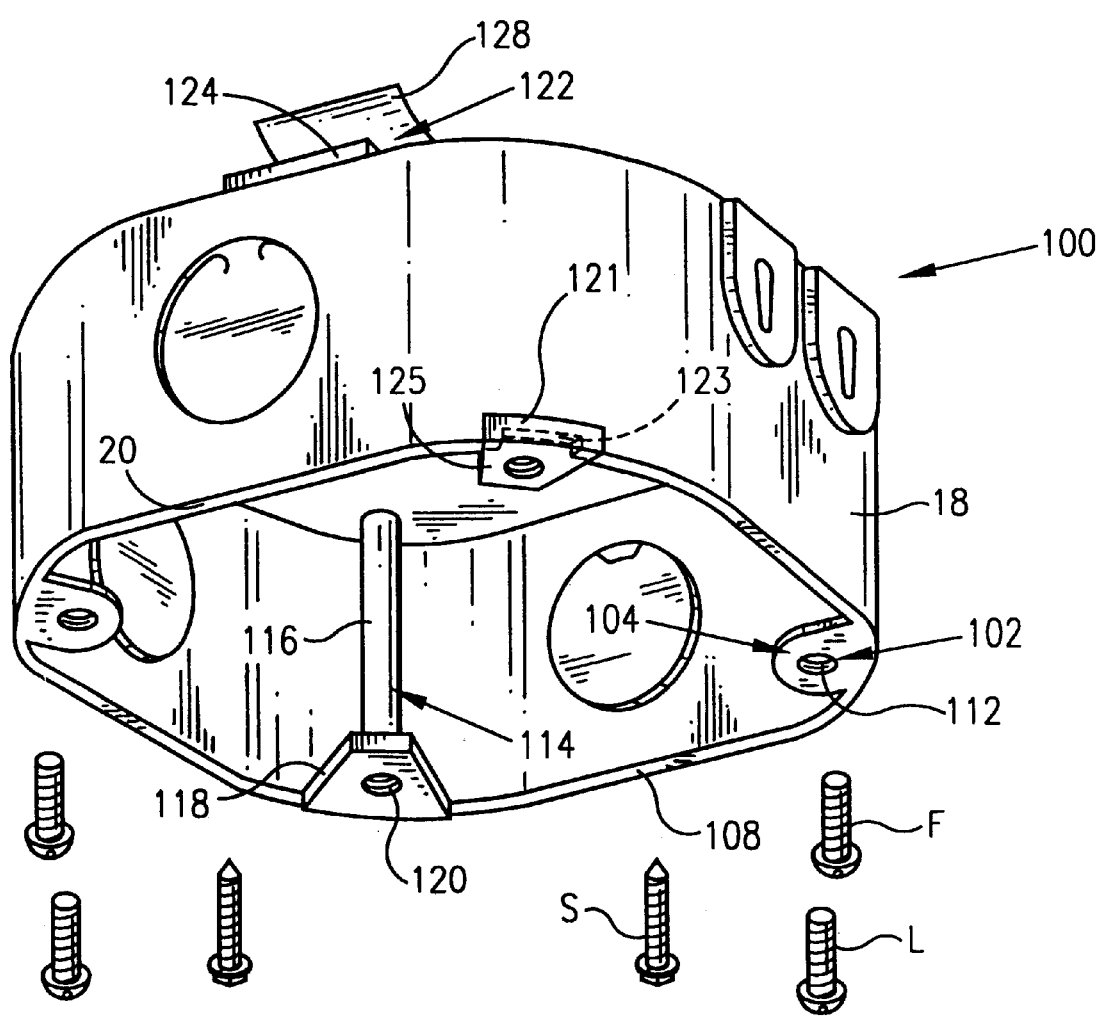
FIG. 5 is a further perspective view of the box of FIG. 4.

FIGS. 4 and 5

FIGS. 4 and 5 illustrate a further preferred embodiment of a junction box 100 according to the invention.

Junction box 100 includes top wall 14, side wall 18, and at least one ear 104 attached to a lower portion 108 of side wall 18. Ear 104 may be attached anywhere along side wall 18, or to top wall 14, depending on the intended use.

Ear 104 includes an extension 102 which may have a hole 112 therein. Hole 112 may be threaded. Hole 112 may extend through ear 104.

Box 100 may include an additional support 114 having an extension or support 116 for assisting in the securing of a support lug 118 having a hole 120 therein. Hole 120 may be threaded for ease in attaching conventional fixture fasteners F and L, for example. Support lug 118 may be provided with a lip 121 which assists in rigidifying the connection between top wall 14 and lower portion 108 of side wall 18 for enhancing the carrying capability of support 114.

A cutout 123 in side wall 18 may be provided to accommodate at least a portion of lip 121 so that a lower face 125 of support lug 118 does not extend past lower free edge 20 of box 100. In that manner, a face plate or fixture may be mounted flush with lower free edge 20.

Figure 10:
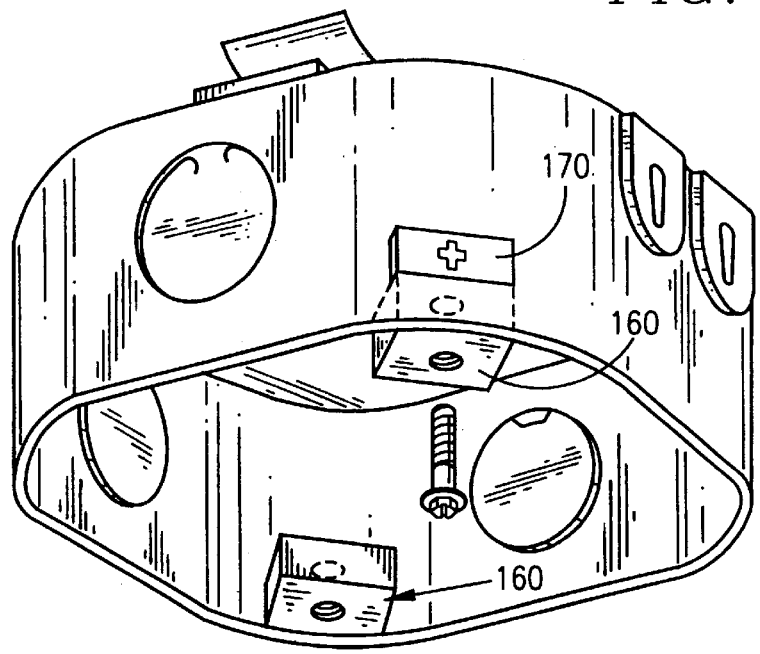
FIG. 10 is a perspective view of the box of FIG. 9.

The features of support 114 may be further appreciated by considering FIG. 10 and the related text, for example, as well as the other embodiments, of co-pending application Ser. No. 08/862,380, filed May 23, 1997, and which is incorporated herein by reference. That previously filed FIG. 10 embodiment works as well as the present embodiment; however, box 100 provides the flexibility of securing ceiling fans to fixture support 114, while having the option of attaching a light fixture to fixture supports 120, for example. Thus, the installer has two types of boxes in one. For example, hole 112 may be provided with 8–32 threads for securing a light fixture with fastener L having mating male 8–32 threads; and, hole 120 may be provided with female 10–32 threads for mating with male 10–32 threads of fastener F when the installer wants to install a ceiling fan or chandelier, for example.

Junction box 100 may include a piece of double-sided tape 122 on top wall 14 thereof. Double-sided tape 122 may be provided with an adhesive portion 124 and a protective strip or layer 128 on the outer face thereof, i.e., on the face of adhesive portion 124 of double-sided tape 122 that has not been adhered to junction box 100. Conventional double-sided tape 122 may be used.

Alternative means for adhering junction box 100 to a surface may be used, such as spray-on adhesive, a piece of putty and other adhering means. Each of those adhering means is as described in my earlier U.S. patent application Ser. No. 08/490,757, filed Jun. 15, 1995, now U.S. Pat. No. 5,677,512, which is a continuation-inpart of 08/371,695, filed Jan. 12, 1995, now U.S. Pat. No. 5,854,443, each of which is incorporated herein by reference, and may be utilized in conjunction with or instead of the double-sided tape 122.

One of the many advantages of junction box 100 is that the user may remove protective layer 128, and then adhere an outer face of adhesive portion 124 of double-sided tape 122 to the surface to which junction box 100 is to be attached. Double-sided tape is selected and sized so that sufficient holding power for temporarily adhering or affixing junction box 100 to the surface is achieved, while the user has both hands free for permanently attaching junction box 100 in the desired location by hammering nails (or shooting screws) through one or more holes 36.

Preferably, the adhesive is sufficiently strong to adhere box 100 to a horizontal surface located above the user's head, and for a sufficiently long period of time so that the user may release box 100 after adhering box 100 to a ceiling or wall, locate a fastener (e.g., nail or screw), and still have enough adhering time left to use both of his or her hands to install the fastener by hammering, screwing, or the like.

The thickness of double-sided tape 122 may be coordinated with the thickness (i.e., height) of any unillustrated outwardly extending top wall protrusions 14, as necessary.

In addition, it is contemplated that the thickness of tape 122 will be varied depending on the characteristics of the surface of the material to which junction box 100 is to be adhered.

FIGS. 6–8

Figure 6:
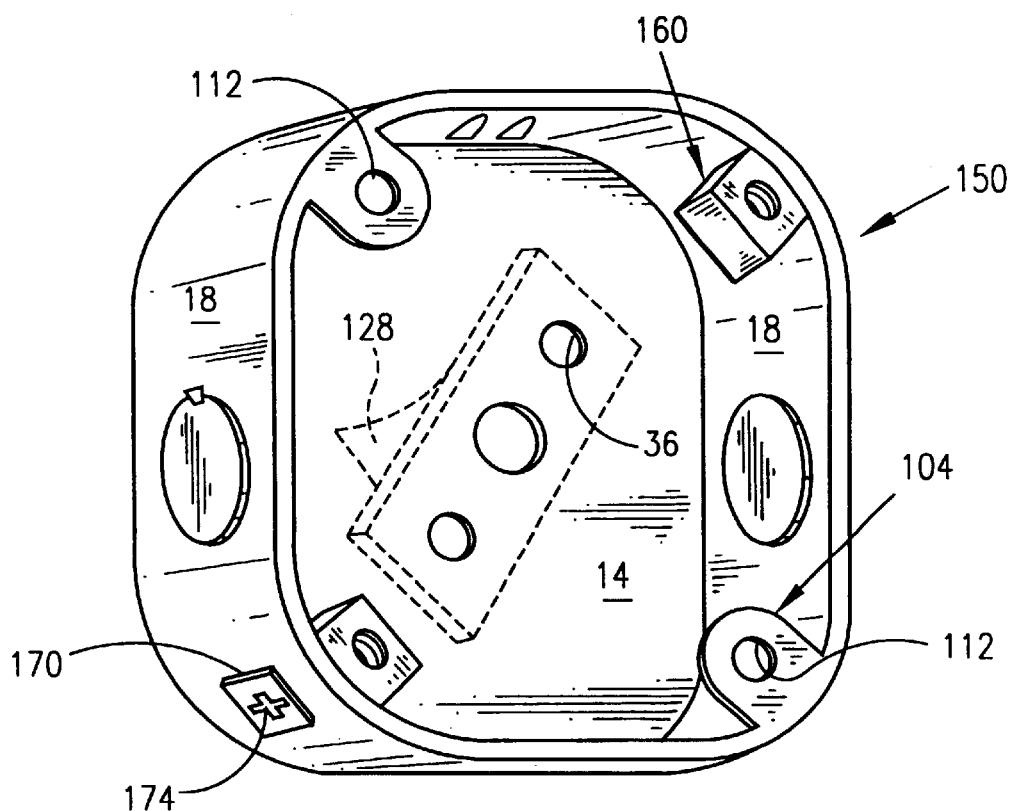
FIG. 6 is a perspective view, similar to FIG. 4, of another preferred embodiment of a junction box according to the invention.
Figure 8:
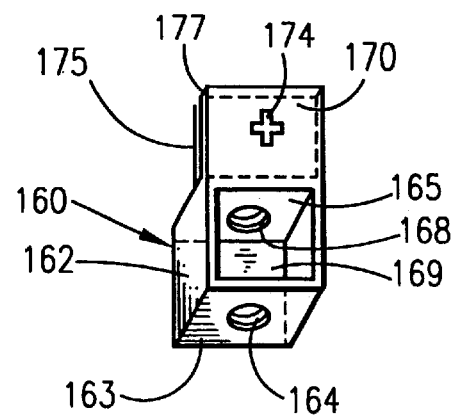
FIG. 8 is a perspective view of another embodiment of a support for use with the embodiment of FIGS. 6 and 7.
Figure 7:
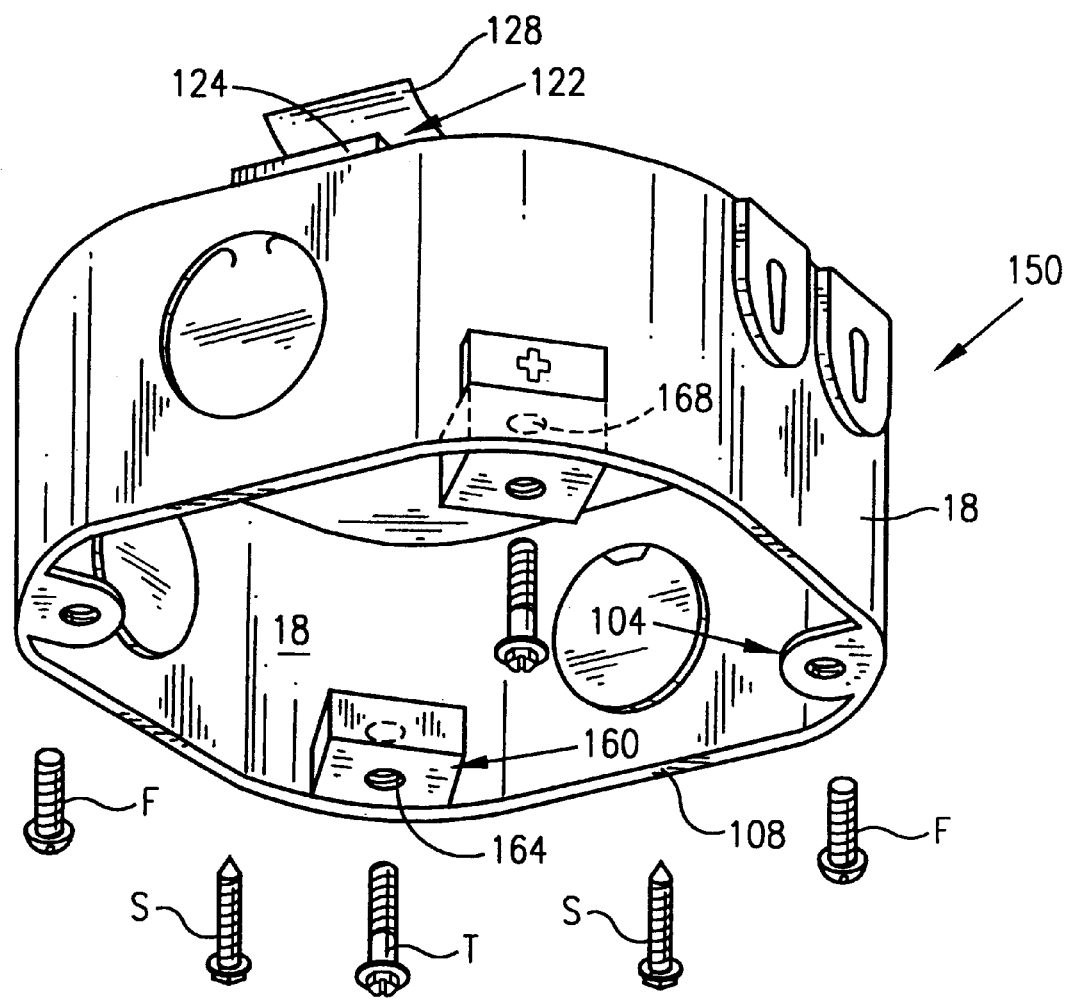
FIG. 7 is a perspective view of the box of FIG. 6.

FIGS. 6–8 illustrate another preferred embodiment of a junction box 150 according to the invention.

Junction box 150 includes some features from the embodiments described above. For example, junction box may 150 include extension 104 having a threaded hole therein for supporting a light fixture, for example. Extension 104 typically extends from lower portion 108 of side wall 18. Hole 36 may be provided in top wall 14 of box 150, likewise as described above.

A fixture support 160 may be supplied in addition to paired extensions 104.

Support 160 may include from one to three side walls 162, depending on the intended use. Typically, again depending on the intended use, a bottom wall 163 having a threaded hole 164 therethrough and/or a top wall 165 having a threaded hole 168 therethrough may be provided. As in the above embodiments, the thread size will typically be dictated by the type of threads used by the expected fixture to be supported. It is contemplated that, as in the other embodiments, hole 112 may have 8–32 threads which are typically used for attaching corresponding male fasteners having 8–32 threads, such as are generally provided with contemporary light fixtures. One or both of threaded holes 164 and 165 may be provided with 10–32 threads for mating with counterpart 10–32 male threads on a fastener T that is used to support a ceiling fan or a chandelier, for example. Other types of threads are contemplated for use with thread sizes other than 8–32 and 10–32. Still further, it is contemplated, as in all the other embodiments, that one or more of holes 112, 164 and 168 may be free of threads, and self-tapping fasteners may be used for securing fixtures to such unthreaded holes.

Conveniently, in the case where a bottom wall 163 is provided bottom wall 163 may be provided in the same plane as the face of lower portion 108 of side wall 18 and/or the lower face of extension 104 so that a cover plate may be attached (flush) thereto as desired. In addition, it is contemplated that bottom wall 163 will be recessed and disposed completely within cavity C or bottom wall 163 will extend outwardly of cavity C (i.e., will extend past lower free edge 20 of box 150 (depending on the intended use).

As will be appreciated, in the case where at least two opposed side walls 162 are provided, in addition to lower wall 163 and upper wall 165, a strong supporting structure will be realized given the open, box-like structure of the illustrated support 160. It will be appreciated that a high strength to weight ratio for support 160 has been achieved with such.

It is further contemplated that an extension or lug 170 may be provided on support 160. Support 160 and lug 170 may conveniently initially be made as a separate component which is attached to the remainder of box 150 prior to use. In such a case, lug 170 may be attached to side wall 18 by the use of a pressure joint 174. Pressure joint 174 is shown as a plus sign ("+"). Pressure joint 174 may be formed during assembly of box 150 by the use of conventional stamping/pressing equipment.

During assembly of box 150, box 150 may be provided with a slot through which lug 170 extends, for example, so that lug 170 is disposed on the outside of side wall 18 while the remainder of support 160 (i.e., side walls 162, and top and bottom walls 163 remain on the interior of box 150. Optionally, lug 170 may be provided with an optional inner layer or wall 175 which is disposed on the inside of side wall 18 and an outer layer or wall 177 disposed on the outer face of side wall 18. After lug 170 is properly positioned, lug 170 and, hence, support 160 is secured relative to the remainder of box 150 (i.e., to side wall 18) by a stamping process, such as at pressure joint 174.

In use, junction box 150 may be attached to a support surface in a manner analogous to the use of the above-described junction boxes.

A pair of heavy-duty fixture fasteners T is shown in FIG. 7 to emphasize that support 160 can be used to carry especially heavy loads, such as chandeliers over 60 lbs. and ceiling fans over 35 lbs.

FIGS. 9, 9A, 10 and 10A

Figure 9:
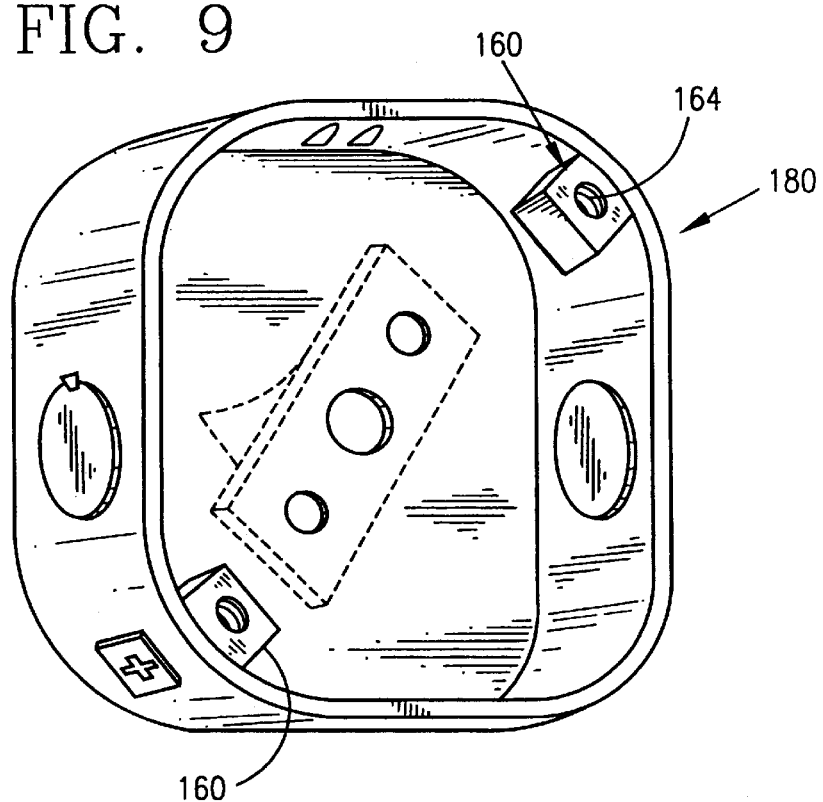
FIG. 9 is a perspective view, similar to FIG. 4, of another preferred embodiment of a junction box according to the invention.

FIGS. 9 and 10 illustrate yet another preferred embodiment of a junction box 180 according to the invention.

Box 180 is preferably provided with at least one pair of supports 160, such as described above in connection with the embodiment of FIGS. 6–8.

Figure 9A:
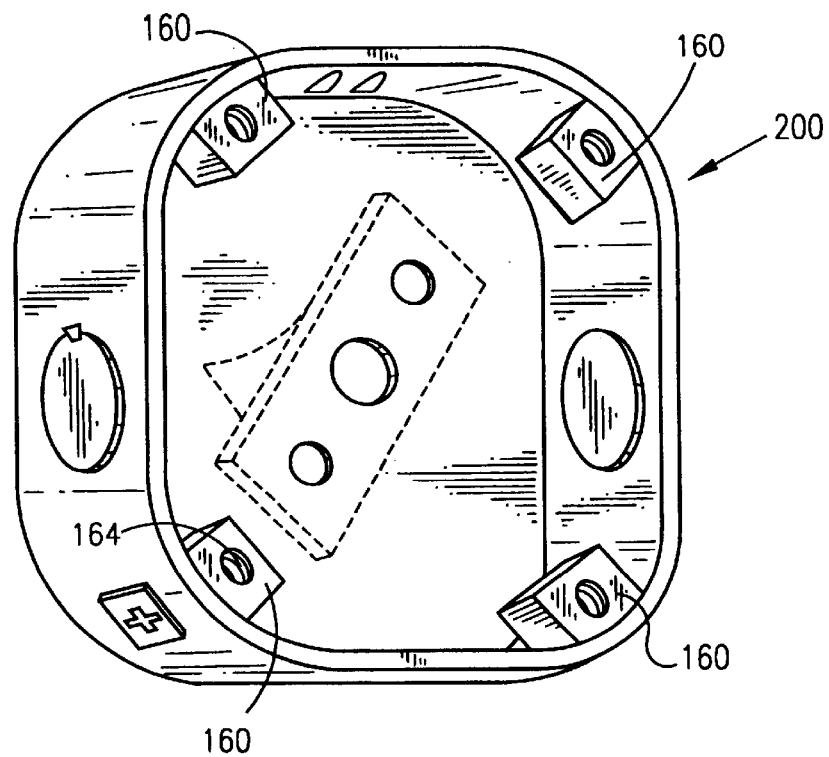
FIG. 9A is a perspective view, similar to FIG. 9, of another preferred embodiment of a junction box according to the invention.

Alternatively, as shown in FIG. 9A, junction box 200 may be provided with opposed pairs of supports 160. In this case, a second pair of supports 160 is provided in addition to the illustrated pair of supports 160 of the embodiment of FIG. 9 and at a location similar to the location of the paired extensions 104 of FIGS. 6 and 7, for example.

The construction, operation and use of junction boxes 180 and 200 is analogous to that described above in connection with the previous embodiments.

Figure 10A:
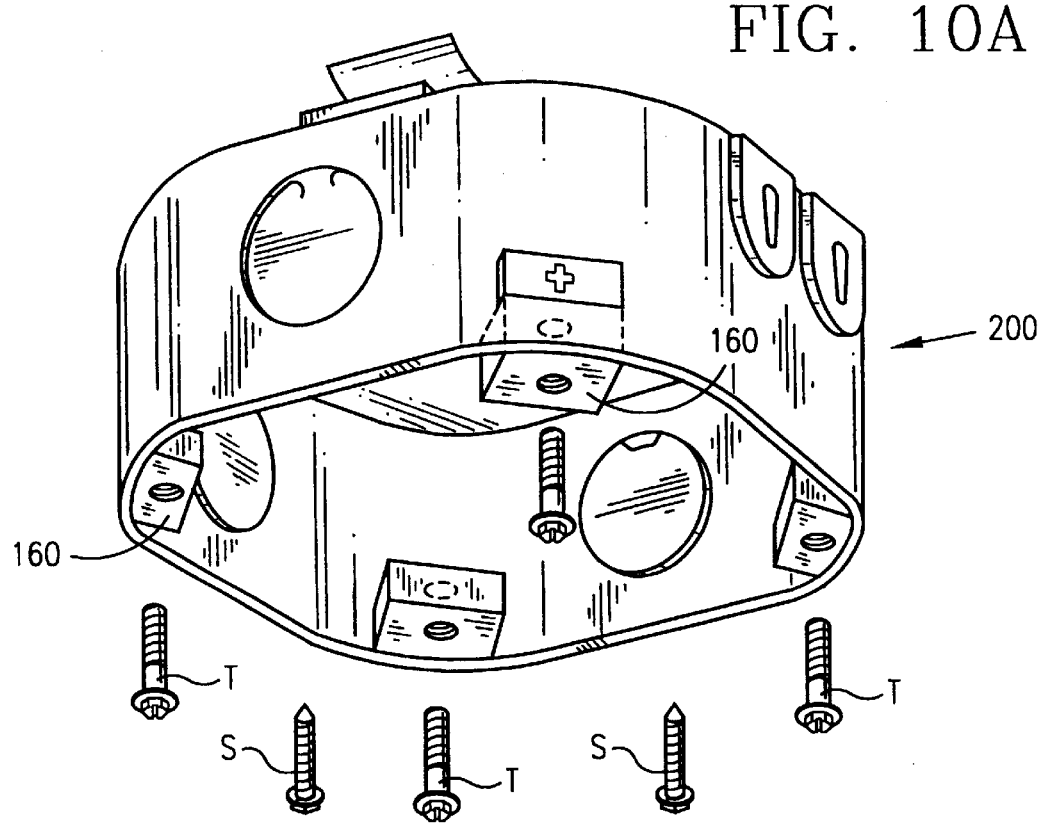
FIG. 10A is a perspective view of the box of FIG. 9A.

For example, one pair of opposed supports 160 in the embodiment of FIGS. 9A and 10A may be provided with 8–32 female fasteners, while the other pair of supports 160 may be provided with 10–32 female fasteners for mating with the fasteners L and F and T, as desired, for example.

FIG. 11

Figure 11:
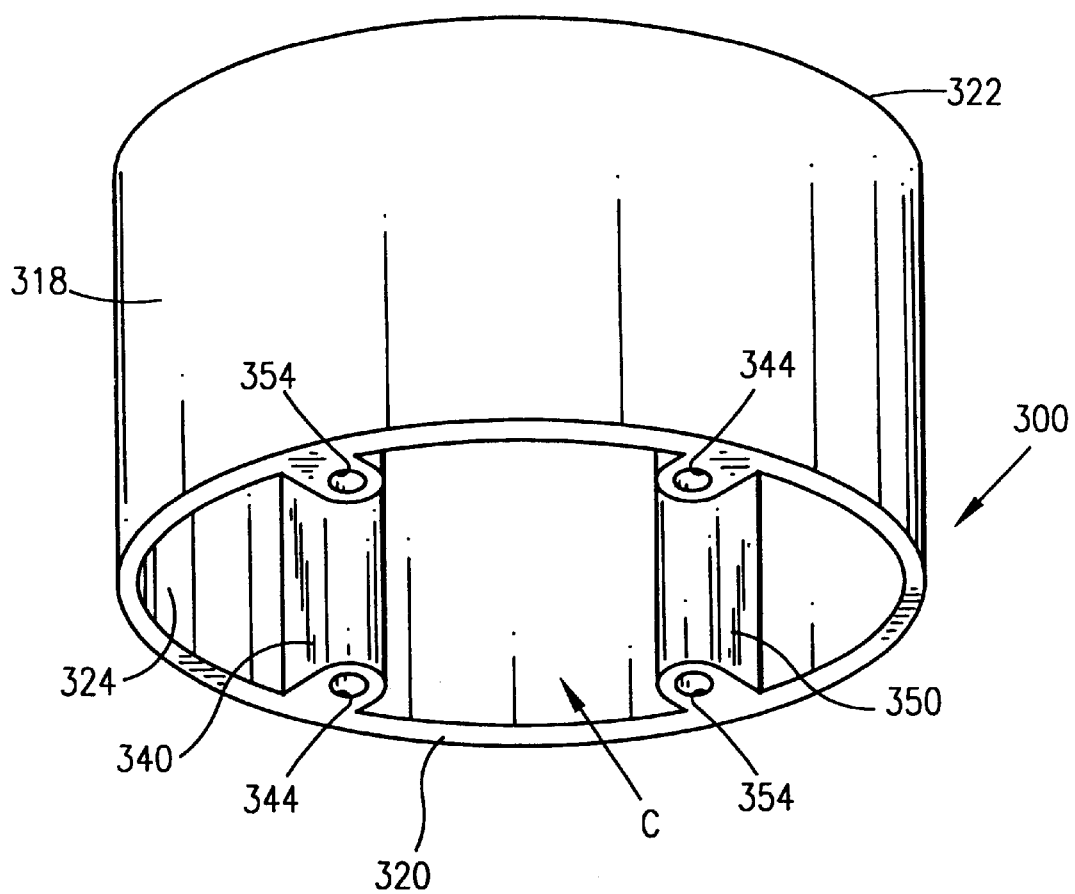
FIG. 11 is a perspective view of another preferred embodiment of a junction box according to the invention.

FIG. 11 illustrates another preferred embodiment of a junction box 300 according to the invention.

Junction box 300 includes a side wall a 318 and a lower free-edge 320. An upper edge 322 is likewise provided.

Typically, cavity C will be defined by an inner face 324 of side wall 318 and the inner face of a top wall which encloses the upper regions of box 300. It is contemplated that box 300 may alternatively have an open upper end similar to the open lower end defined by free edge 320.

Box 300 may be made of plastic, for example.

It is contemplated that at least one pair of opposed supports 340 be provided and that each support 340 will have a hole 344 defined therein. As in the other preferred embodiments, hole 344 may have internal threads, or not, depending on the intended use. When hole 344 is free of internal threads, self-tapping fasteners may be used for securing fixtures to box 300, as in the other embodiments. Alternately, when holes 344 have no threads, and box 300 is opened ended, sufficiently long fasteners may be used so that the fasteners extend through the top of box 300 and are secured to box 300 by the use of nuts, for example, in the case where fasteners are screws or bolts.

As shown, it is likewise contemplated that a further pair of fixture supports 350 be provided, conveniently spaced apart from supports 340. Typically, supports 350 will have holes 354 which differ in size from hole 344 of fasteners 340, as in the other embodiments, so that different types of fasteners may be attached to hole 354. As with support 340, hole 354 may be provided with or without threads depending on whether or not the use of threaded, unthreaded, or self-tapping threaded fasteners is contemplated. Any variety of holes and thread sizes may be used. For use with current light, fans, and chandeliers, holes 344, for example, will be provided with 8–32 internal threads, and holes 354 will be provided with 10–32 internal threads for use with light fixtures and ceiling fans/chandeliers, respectively.

The embodiment of FIG. 11 is shown with supports 350 illustrated as inwardly extending extensions, typically molded or extruded at the same time that side wall 318 is manufactured. In the case were supports 340 and 350 are provided as inwardly extending extensions, as shown, the volume of cavity C is relatively large, as will be appreciated. It is contemplated that supports 340 and 350 be provided as in a variety of shapes, or that side wall 318 will be sufficiently thickened around some or all of its entire perimeter so that hole 344 and 354 may be formed in side wall 318 without the need for inwardly extending extensions, as illustrated.

FIG. 12

Figure 12:
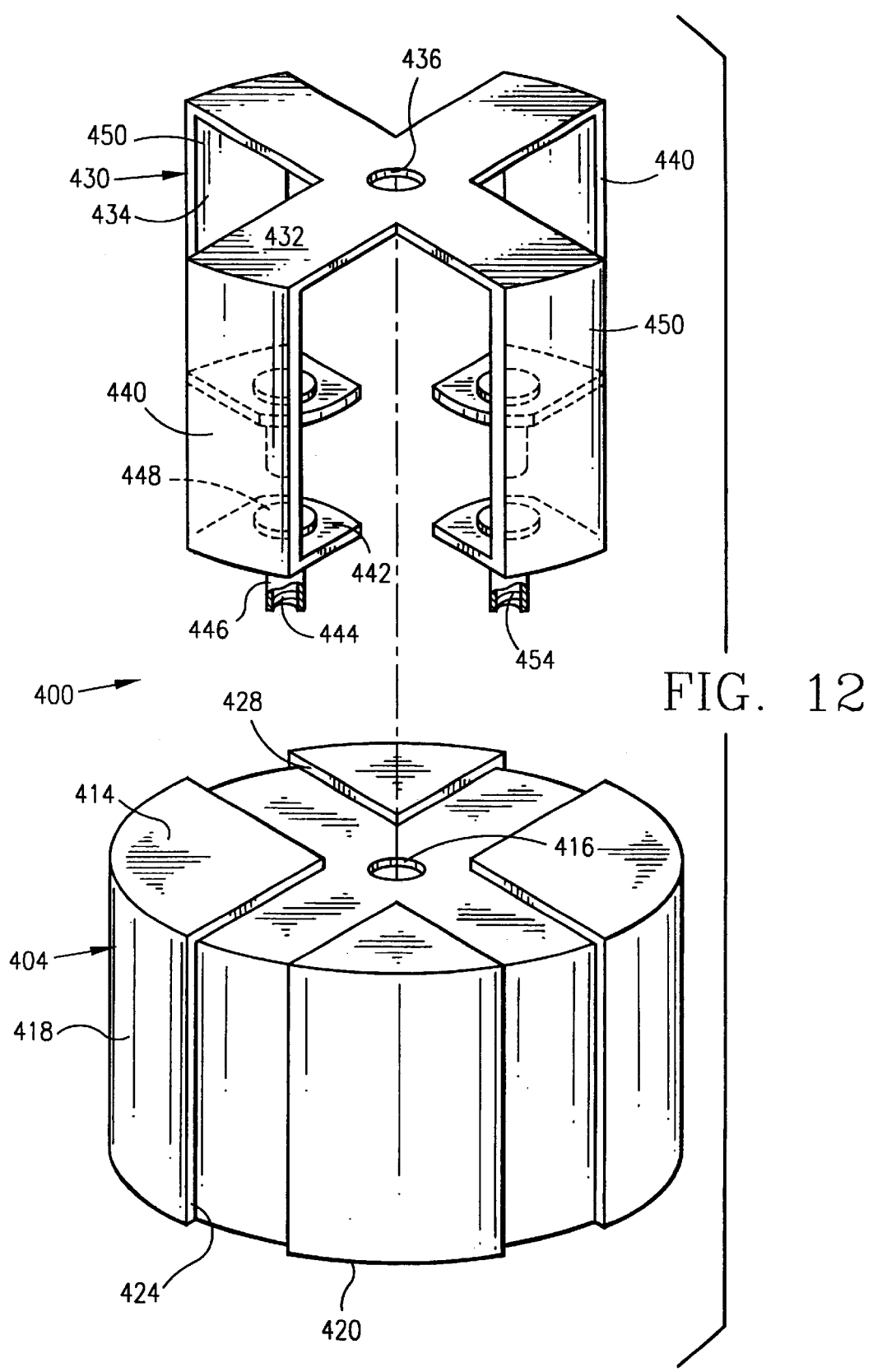
FIG. 12 is a exploded perspective view of yet another preferred embodiment of a junction box according to the invention.

Turning to FIG. 12 another preferred embodiment of an electrical box 400 according to the invention is illustrated.

Electrical box 400 is shown in an exploded view, and includes a housing 404 having an upper wall 414 with a hole 416 therethrough, and a downwardly extending side wall 418. Upper wall 414 and side wall 418 define cavity C as in the other preferred embodiments.

A hole 416 is provided in top wall 414 so that a fastener can be inserted therethrough in order to secure electrical box 400 to a support, such as a joist.

A lower free edge 420 is provided on housing 404. A recess or inset portion 424 is provided in side wall 418, and a recess or inset portion 428 is provided in top wall 414.

Conveniently, housing 404 may be made of plastic.

A support structure 430, which may be mad e of metal, is sized and configured for mating with housing 404 as will be readily appreciated. Support structure 430 includes a top support element or plate 432 and at least one side support element or plate 434.

Conveniently a hole 436 may be provided in top support element 432 that aligns with hole 416 of housing 404 when electrical box 400 is assembled for use.

At least a first pair of spaced apart fixture supports 440 is provided. Fixture support 440 includes side support element 434 and an outwardly extending support element or plate 432 which may be provided at a lower end thereof, as illustrated.

Support 440 further includes a hole 444 which may be threaded, as illustrated, that is provided in an extension 446 of support 440. Conveniently, extension 446 may be provided with a head 448 by which extension 446 may be inserted through a hole in support 442 and secured by head 448. It is contemplated that extension 446 have fluting thereon as in the above-described embodiments, and which fluting engages with the inner wall of the hole extending through support 442. It is further contemplated that extension 446 be attached, such as by riveting, for example.

A further support 450 may be provided. Support 450 may likewise have a corresponding hole 454 with or without threads therein for receiving mating fasteners. As in the other preferred embodiments of the invention, it is contemplated that, in the case where holes 444 and 454 are threaded holes, hole 454 has 8–32 female threads and hole 454 has 10–32 female threads, for example, for mating with conventional light fixture fasteners L and chandelier/ceiling fan fastener F and T.

Support structure 430 may be integrally attached to housing 404 during the manufacturing process, or support structure 430 may be sufficiently resilient so that it may be snap-fit over housing 404 and aligned so that upper support 432 is disposed in the recess 428 and side support 430 is disposed in recess 424, as will be readily appreciated.

It is further contemplated that support plates may be 442 provided at various locations spaced from upper support 432, depending on the intended use. The illustrated disposition of support 442 at the lower end of support 430 is shown by way of example. The relative lengths of extensions 446 may be varied so that extension 446 are completely disposed in cavity C or extend outwardly thereof, depending on the intended use.

VARIATIONS

It is contemplated that in all the embodiments of the invention, the fixture supports and the related strengthening components, for example, may all be disposed on the interior of or the exterior of cavity C.

It has been found that for intended uses where relatively large static and dynamic forces are expected, fewer knurlings/flutes each extending outwardly of support 40 generally resist such forces better than more knurlings having a shorter length extending outwardly of the remainder of stud 40 for similar applications.

In addition to or instead of the supports and/or studs used in the various embodiments, it is expected that locking coupling nuts will be used to attach the fixture supports to the junction box, as well as any other means of fastening supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, non-metallic materials, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
   a) a junction box including a top wall and a side wall;
   b) said side wall extending downwardly away from said top wall and defining a cavity therein;
   c) a fixture support disposed adjacent said box;
   d) said fixture support being configured for supporting a first type of fastener engaged therewith;

e) a further fixture support disposed adjacent said box;

f) said further fixture support being configured for supporting a second type of fastener engaged therewith; and g) a knurled surface provided on at least one of said fixture support and said further fixture support for securing said at least one of said fixture support and said further fixture support to said top wall.

2. A mounting assembly as defines in claim 1, wherein:

a) a threaded hole is provided on at least one of said fixture support and said further fixture support.

3. A mounting assembly as defined in claim 1, wherein:

a) at least one of said fixture support and said further fixture support engages a portion of said side wall of said box.

4. A mounting assembly as defined in claim 1, wherein:

a) said fixture support includes an ear provided on said box; and b) said ear extends transversely relative to said side wall.

5. A mounting assembly as defined in claim 1, wherein:

a) said fixture support includes a stud; and b) said stud is attached to said top wall.

6. A mounting assembly as defined in claim 1, wherein:

a) a reinforcing element engages said fixture support and engages at least one of said top wall and said side wall.

7. A mounting assembly as defined in claim 6, wherein:

a) said fixture support includes a first and second spaced apart fixture support; and b) said reinforcing element includes a plate extending between and reinforcing each said first and second fixture support.

8. A mounting assembly as defined in claim 1, wherein:

a) said side wall includes a lower portion;

b) a support lug is disposed on said lower portion of said side wall of said box; and c) said support lug engages said fixture support.

9. A mounting assembly as defined in claim 1, wherein:

a) at least a portion of said fixture support extends into said cavity.

10. A mounting assembly as defined in claim 1, wherein:

a) an adhesive is provided on said top wall of said junction box; and b) said adhesive is sufficiently strong for adhering said junction box to a support surface.

11. A mounting assembly as defined in claim 10, wherein:

a) said adhesive including a piece of double-sided tape.

12. A mounting assembly as defined in claim 1, wherein:

a) said fixture support includes an extension disposed on said box; and b) said extension extends away from one of said top wall and side wall.

13. A mounting assembly as defined in claim 12, wherein:

a) said extension is dispose d on said side wall.

14. A mounting assembly as defined in claim 12, wherein:

a) a further extension is provided adjacent said extension; and b) said extension and said further extension each support a first type of fastener.

15. A mounting assembly as defined in claim 12, wherein:

a) said extension and said further extension are spaced apart an disposed on said side wall;

b) each said extension and said further extension has a hole therein; and c) each said hole is configured and located so that a fixture fastener may be supported thereby.

16. A mounting assembly, comprising:

a) a junction box including a top wall and a side wall;

b) said side wall extending downwardly away from said top wall and defining a cavity therein;

c) a fixture support disposed on said box;

d) said fixture support being configured for supporting a first type of fixture fastener engaged therewith;

e) said fixture support including two spaced apart walls configured for supporting a fixture fastener and said two walls extending transversely relative to said side wall;

f) an extension disposed on at least one of said two walls, and said extension extending transversely thereto; and g) said extension being disposed on said box.

17. A mounting assembly as defined in claim 16, wherein:

a) a pressure joint attaches said extension to said box.

18. A mounting assembly as defined in claim 16, wherein:

a) said extension is attached to said side wall of said box.

19. A mounting assembly as defined in claim 16, wherein:

a) a threaded hole is provided in at least one of said two spaced apart walls for supporting a first fastener.

20. A mounting assembly as defined in claim 16, wherein:

a) said fixture support includes a third wall which extends between said two spaced apart walls.

21. A mounting assembly as defined in claim 16, wherein:

a) a further fixture support is provided on said box, said further fixture support being configured for supporting a second type of fastener.

22. A mounting assembly as defined in claim 16, wherein:

a) said junction box comprises a non-metallic material.

23. A mounting assembly as defined in claim 22, wherein:

a) said fixture support is disposed inside said cavity.

24. A mounting device as defined in claim 16, wherein:

a) an adhesive is provided on said top wall of said junction box; and b) said adhesive is sufficiently strong for adhering said junction box to a support surface.

25. A mounting assembly as defined in claim 1, wherein:

a) said junction box comprises a non-metallic material.

26. A mounting assembly as defined in claim 25, wherein:

a) said fixture support and said further fixture support comprise a non-metallic material.

27. A mounting assembly as defined in claim 1, wherein:

a) at least a portion of said fixture support extends outside said cavity.

28. A mounting assembly, comprising:

a) a junction box including a top wall and a side wall;

b) said side wall extending downwardly away from said top wall and defining a cavity therein;

c) a fixture support disposed adjacent said box;

d) said fixture support including a stud;

e) said stud being attached to said top wall;

f) said fixture support being configured for supporting a first type of fastener engaged therewith;

g) a further fixture support disposed adjacent said box;

h) said further fixture support being configured for supporting a second type of fastener engaged therewith; and i) at least one of said fixture support and said further fixture support engaging a portion of said side wall of said box.

29. A mounting assembly as defined in claim 28, wherein:
a) a threaded hole is provided on at least one of said fixture support and said further fixture support.

30. A mounting assembly as defined in claim 28, wherein:
a) said fixture support includes an ear provided on said box; and
b) said ear extends transversely relative to said side wall.

31. A mounting assembly as defined in claim 28, wherein:
a) an adhesive is provided on said top wall of said junction box; and
b) said adhesive is sufficiently strong for adhering said junction box to a support surface.

32. A mounting assembly, comprising:
a) a junction box including a top wall and a side wall;
b) said side wall extending downwardly away from said top wall and defining a cavity therein;
c) a fixture support disposed adjacent said box;
d) said fixture support including a stud;
e) said stud being attached to said top wall;
f) said fixture support being configured for supporting a first type of fastener engaged therewith;
g) a further fixture support disposed adjacent said box;
h) said further fixture support being configured for supporting a second type of fastener engaged therewith;
i) said fixture support including an ear provided on said box; and
j) said ear extending transversely relative to said side wall.

33. A mounting assembly as defined in claim 32, wherein:
a) a threaded hole is provided on at least one of said fixture support and said further fixture support.

34. A mounting assembly as defined in claim 32, wherein:
a) a reinforcing element engages said fixture support and engages at least one of said top wall and said side wall.

35. A mounting assembly as defined in claim 32, wherein:
a) an adhesive is provided on said top wall of said junction box; and
b) said adhesive is sufficiently strong for adhering said junction box to a support surface.

36. A mounting assembly, comprising:
a) a junction box including a top wall and a side wall;
b) said side wall extending downwardly away from said top wall and defining a cavity therein;
c) a fixture support disposed adjacent said box;
d) said fixture support being configured for supporting a first type of fastener engaged therewith;
e) a further fixture support disposed adjacent said box;
f) said further fixture support being configured for supporting a second type of fastener engaged therewith;
g) said fixture support includes a stud; and
h) said stud is attached to said top wall.

37. A mounting assembly as defined in claim 36, wherein:
a) a threaded hole is provided on at least one of said fixture support and said further fixture support.

38. A mounting assembly as defined in claim 36, wherein:
a) a reinforcing element engages said fixture support and engages at least one of said top wall and said side wall.

39. A mounting assembly as defined in claim 38, wherein:
a) said fixture support includes a first and second spaced apart fixture support; and
b) said reinforcing element includes a plate extending between and reinforcing each said first and second fixture support.

40. A mounting assembly as defined in claim 36, wherein:
a) an adhesive is provided on said top wall of said junction box; and
b) said adhesive is sufficiently strong for adhering said junction box to a support surface.

41. A mounting assembly, comprising:
a) a junction box including a top wall and a side wall;
b) said side wall extending downwardly away from said top wall and defining a cavity therein;
c) a fixture support disposed adjacent said box;
d) said fixture support being configured for supporting a first type of fastener engaged therewith;
e) a further fixture support disposed adjacent, said box;
f) said further fixture support being configured for supporting a second type of fastener engaged therewith; and
g) a reinforcing element engages said fixture support and engages at least one of said top wall and said side wall.

42. A mounting assembly as defined in claim 41, wherein:
a) a threaded hole is provided on at least one of said fixture support and said further fixture support.

43. A mounting assembly as defined in claim 41, wherein:
a) said fixture support includes an ear provided on said box; and
b) said ear extends transversely relative to said side wall.

44. A mounting assembly as defined in claim 41, wherein:
a) said fixture support includes a first and second spaced apart fixture support; and
b) said reinforcing element includes a plate extending between and reinforcing each said first and second fixture support.

45. A mounting assembly as defined in claim 41, wherein:
a) an adhesive is provided on said top wall of said junction box; and
b) said adhesive is sufficiently strong for adhering said junction box to a support surface.

46. A mounting assembly, comprising:
a) a junction box including a top wall and a side wall;
b) said side wall extending downwardly away from said top wall and defining a cavity therein;
c) a fixture support disposed adjacent said box;
d) said fixture support being configured for supporting a first type of fastener engaged therewith;
e) a reinforcing element engaging said fixture support and engaging at least one of said top wall and said side wall;
f) a further fixture support disposed adjacent said box;
g) said further fixture support being configured for supporting a second type of fastener engaged therewith;
h) said fixture support including an ear provided on said box; and
i) said ear extending transversely relative to said side wall.

47. A mounting assembly as defined in claim 46, wherein:
a) an adhesive is provided on said top wall of said junction box; and
b) said adhesive is sufficiently strong for adhering said junction box to a support surface.

* * * * *